April 18, 1939.   M. M. CORY   2,154,807
DEVICE FOR TREATING FLUIDS
Filed Dec. 7, 1935   2 Sheets-Sheet 1
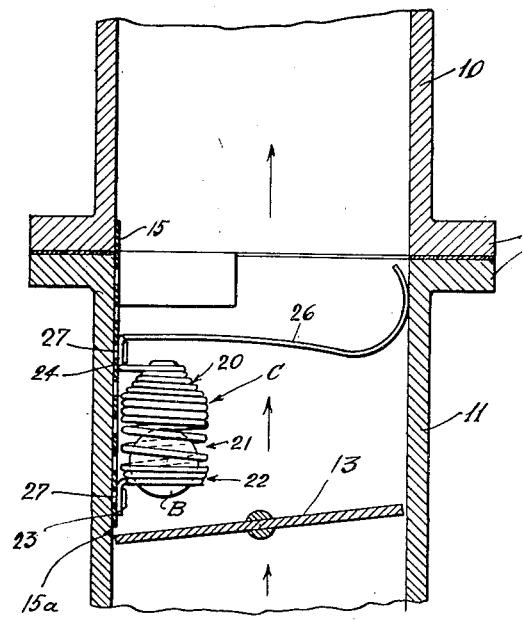
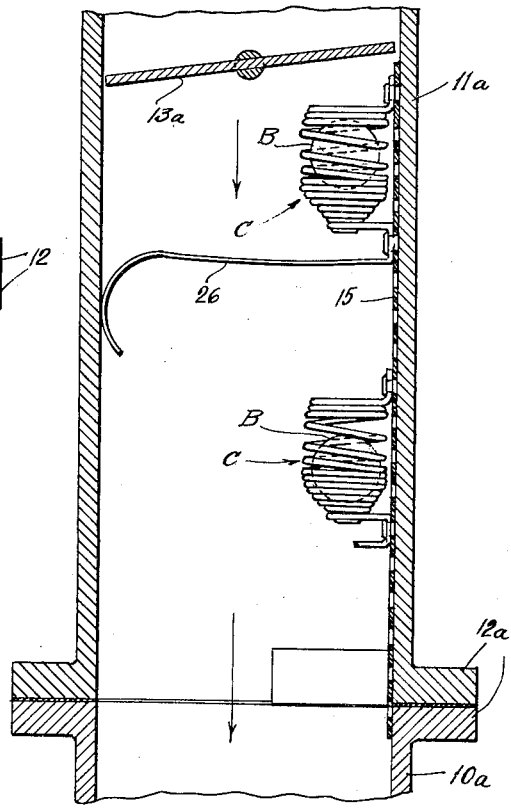
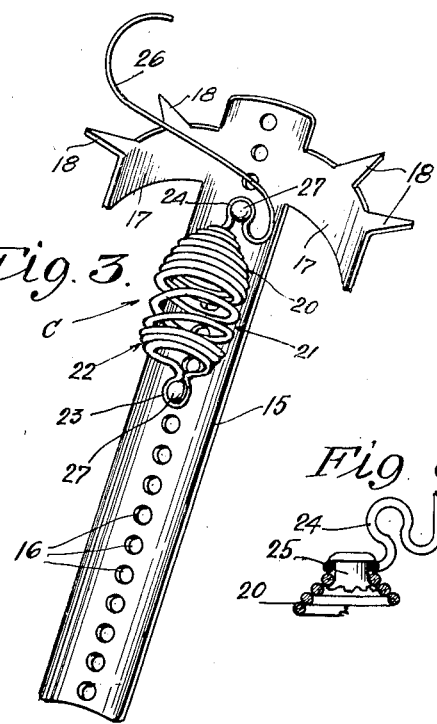
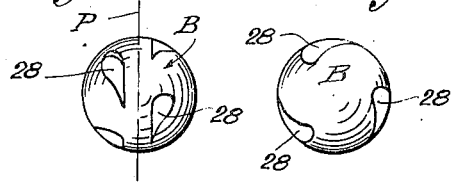
Inventor
Marcus M. Cory.
Attorney.

April 18, 1939.     M. M. CORY     2,154,807
DEVICE FOR TREATING FLUIDS
Filed Dec. 7, 1935     2 Sheets—Sheet 2
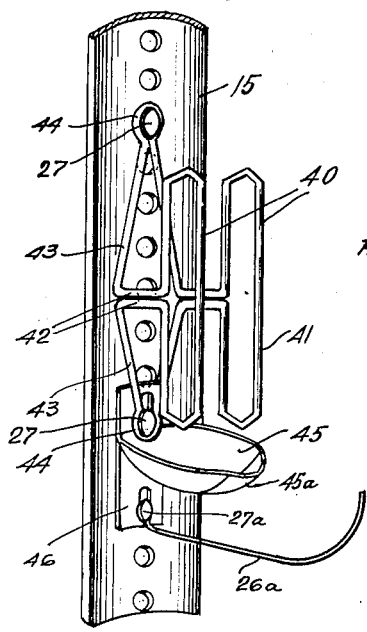
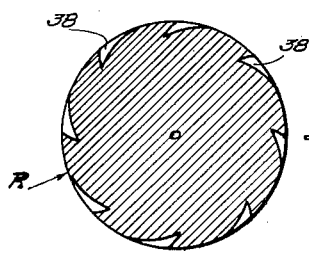
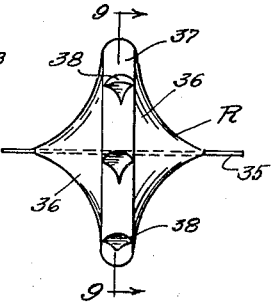
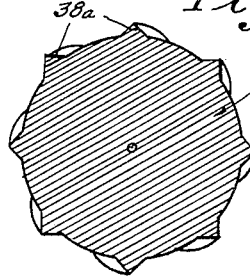
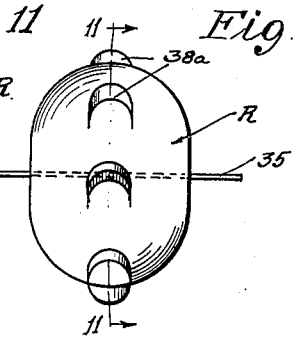
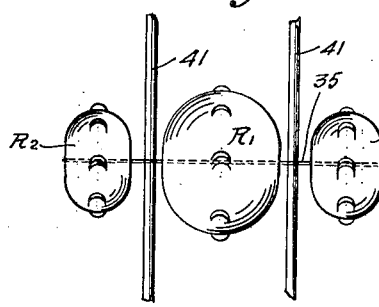
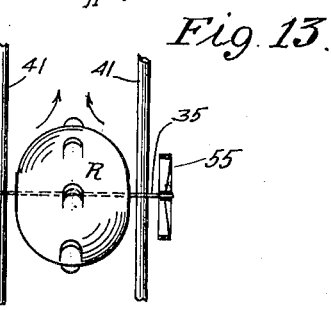
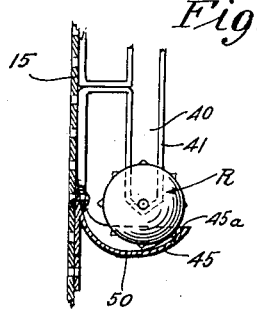
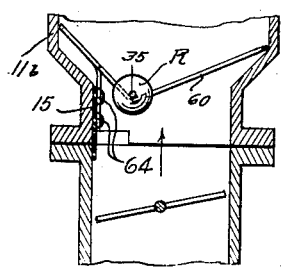
Inventor
Marcus M. Cory.
Attorney.

Patented Apr. 18, 1939

2,154,807

UNITED STATES PATENT OFFICE 2,154,807

DEVICE FOR TREATING FLUIDS

Marcus M. Cory, San Diego, Calif.

Application December 7, 1935, Serial No. 53,389

25 Claims. (Cl. 48—180)

This invention relates to devices designed and adapted for physical treatment of fluids; and while the invention has a wide range of uses, for treatment of fluids, or even solids, in manners similar and analogous to the specific manners and effects hereinafter set out, it is best explained and most easily understood in its application to treatment of the mixed gaseous fluids that constitute the fuel mixture taken into an internal combustion engine, for instance. Therefore, but without any implied limitation upon the invention, or upon its uses and effects, I prefer to describe the invention, in typical and illustrative forms, as applied specifically to carbureted air as drawn into an internal combustion engine. From a description of such specific and illustrative forms of the invention, and of such specific applications and use, the general functions and utilities, and applicability to other uses, will be readily understood. While I describe the action and effect of a rotor treating fluid in motion, it will be understood that the invention is not limited against analogous uses of such a rotor to effect similar results on non-fluid bodies, whether or not in motion.

In some of its aspects, the present invention is in the nature of improvements upon the system and apparatus disclosed in such patents as those issued to Lynn et al., No. 1,806,356, Lynn et al., No 1,806,404, and W. M. Malouf, No. 1,806,406. In the system to which these named patents relate, a freely rotatable rotor, such as a ball of suitable size and provided with peripheral vanes, is located in the stream of fuel vapor and air passing through an engine in-take pipe, in such manner that the stream impinging upon the ball raises it into a substantially free floating position and rotates the ball at high speed. The rotary action of the ball acts upon the fuel vapor and air in the manner of a centrifuge, and also sets up supersonic wave trains in the mixture; with the general result that the fluid mixture is not only most thoroughly admixed so as to be substantially homogeneous but also that vaporization of the entrained liquid fuel particles is promoted so highly as to cause quite complete vaporization. The result is, in general, to promote an efficiency of combustion so high that, for instance, the carbonmonoxide content of the exhaust gases is reduced from an average of 8 to 15 per cent to an amount much less than one per cent.

Without the necessity of going further into the details of action and effects, I may point out that the prior devices have certain shortcomings and deficiencies, and those, among other things, it is one of the objects of my invention to overcome. Briefly stated, these prior devices encountered difficulties relative to effective mounting in, for instance, an engine in-take passage; and it is one of the objects of my invention to overcome that difficulty. Again it is to be noted that in the use of a freely floating ball it is necessary that the ball first orient itself about its proper axis of rotation before it can begin efficient rotation at the high speed desired; and the reactive vanes with which the ball is provided must be formed with a view to expending some of the energy in orienting the ball, and therefore taking away from that total energy which otherwise might be used to drive the ball at high rotary speed. It is, among other things, also an object of my present invention to provide a form and mounting of rotor which, although freely floating when in action, is otherwise held in its proper oriented position so that it instantaneously effects its proper rotation and uses the whole of the available energy for high speed rotation.

There are various other objects and accomplishments of my invention, but those, together with preferred details of construction and function, illustrative of the invention, will best be understood from the following detailed description of specific forms and specific applications. For that purpose I refer to the accompanying drawings, in which:

Fig. 1 is a longitudinal vertical section showing one form of my improved device applied to an in-take pipe, such as that of an internal combustion engine;

Fig. 2 is a similar view showing a modified application of my improved device;

Fig. 3 is a perspective showing the device itself;

Figs. 4 and 5 are elevations of a typical form of rotor ball used in such devices;

Fig. 6 is an enlarged detail section of the end of the ball containing cage used in the form of the foregoing figures;

Fig. 7 is a fragmentary perspective showing a modified form of mounting for such forms of rotors as are shown in the following figures;

Fig. 8 is an elevation of an improved form of rotor;

Fig. 9 is a central cross-sectional view on line 9—9 of Fig. 8;

Fig. 10 is an elevation of another improved form of rotor;

Fig. 11 is a central cross-section on line 11—11 of Fig. 10;

Fig 12 is an elevational view of another improved form of rotor;

Fig. 13 is an elevation of a further improved form of rotor;

Fig. 14 is a fragmentary vertical section showing a typical position assumed by a rotor when at rest in the mounting of the form shown in Fig. 7;

Fig. 15 is a central longitudinal section showing another modification of rotor confining and supporting means; and Fig 16 is a detail perspective of certain parts shown in Fig. 15.

In Fig. 1 of the drawings 10 may indicate the intake pipe which leads to the usual intake manifold of an internal combustion engine, and 11 may indicate the mixture pipe or passage of a typical up-draft carbureter, which mixture pipe or passage is attached by flanges 12 to the intake pipe 10. In this particular arrangement the carbureter throttle valve, usually located in about the position shown at 13, and usually of the butterfly form, opens by movement in the direction indicated by the arrow.

In Fig. 2 I have illustrated a typical assembly involving a down-draft carbureter, where the engine intake pipe is indicated at 10a, the carbureter mixture passage or pipe is indicated at 11a, the two being secured together by flanges 12a. In this case, and in order further to illustrate and describe the adaptability of my improved mounting, I have shown the carbureter throttle 13a at some distance above the flanges 12a. These two variant arrangements will serve to describe the wide applicability of my device. It will be understood that, with respect to carbureter and intake pipe arrangements, there are large diverse variations at present in use, and to which devices of the type here under consideration should be applicable. In the past it has been found necessary to provide a correspondingly large number of different kinds and types of mounts; and it is one of the particular accomplishments of my invention that it provides a single and universally applicable mount which may be easily applied to all of the various conditions ordinarily met with.

In one typical form the device itself is shown in Fig. 3. An elongated mounting body 15 is made of sheet metal, bent transversely to the wall curvature of an average intake pipe, and provided along its length preferably with a plurality of closely spaced mounting holes 16, the series of holes preferably extending from end to end.

Preferably near one end, this elongated mounting base 15 is provided, at its opposite edges, with curved, transversely extending arms 17, preferably formed integrally out of the same metal sheet as mounting base 15. The sheet metal of which the mounting is formed is preferably thin enough that arms 17 may be fairly easily bent to modify their curvature to coincide with the curvatures found in different intake pipes of different diameters; and when these arms 17 are properly bent so that they may lie snugly against the curved wall of an intake pipe, then the tabs 18 which project from the edges of arms 17 may be introduced into the gasket space between the connection flanges 12; with the result that when the flanges are tightly bolted together, the tabs 18 and the mounting base, is held in proper position. The excess length of the mounting base 15 is cut off at 15a to avoid interference with functioning of valve 13 or restriction of a bent intake pipe by extending beyond and into the curve.

In this proper position, as applied to an engine intake pipe, the elongate mounting base 15 extends longitudinally of and against the wall of the conduit, as is illustrated in Figs. 1 and 2; and the ends of this mounting base which is, as described, secured at the flange joint is rigidly held in its proper position. The most effective position for the whole device is one in which the device is in line with that side of the throttle valve 13 which moves outwardly (toward the carbureter) in opening. That is the side of the carbureter conduit in which the idling by-pass usually discharges.

The rotor confining cage C which I use in this form of my improved device, is in the nature of a wire frame and is preferably made of a single piece of wire wound helically so as to form, for one end of the cage, a conoidal end portion 20 in which the wire helix is wound closely. It is not necessary that the wire helix in this portion be wound in tight contact. Contact is preferred, but a slight looseness is not fatal to operation. However, this spacing should not be more than slight, as the purpose of the conoidal portion 20 is to form a cup in which the confined ball has a fluid cushion seat.

In the medial portion of the cage the wire of the helix is wound widely spaced, as indicated at 21; to afford an open cage portion in this part; to allow escape of the driving medium and thereby tend to hold the ball there, also to allow a freer discharge from its periphery. At the opposite end, as at 22, the helix is preferably again wound closely, the end convolutions or convolution being wound to a small enough diameter that the enclosed ball cannot escape at the otherwise open end. In Fig. 3 the ball is not shown in place within the cage, for clarity of illustration of the cage. At the last mentioned end of the cage, the end of the wire is brought out to form an attachment loop 23; and at the first mentioned conoidal end of the cage the wire is brought out to form another attachment loop 24. At this end of this conoidal portion 20 of the cage, the small central opening which would be otherwise left within the smallest wire convolutions is closed in any suitable manner, as for instance simply by a rivet as shown at 25 in Fig. 6.

The wire of which the cage is formed is further extended from the loop 24 in the form of a curved resilient brace 26, which, when the device is installed in an intake pipe, is adapted to be properly deformed or bent, preferably resiliently deformed, to extend across the intake pipe and bear against the opposite wall. The intent and purpose of this brace is to hold the mounting base 15 back against the wall to which the mounting base is attached by the prongs 18 at its base clamped between the flanges 12, and thus the mounting base is held rigidly against the wall at two points.

The ball containing cage can, as will be readily understood, be secured to the mounting base 15 in any selected position along the length of that mounting base. It is preferably and simply secured to the mounting base by the use of a pair of rivets 27. In some cases, as for instance in Fig. 1, the cage will be secured on the mounting base in the position fairly close to the mounting arms 17. In other cases, as shown in Fig. 2, the cage may be secured at a point on base 15 quite a distance from the mounting arms 17; and base 15 is initially made long enough to allow the cage to be mounted at whatever distance may, in any particular installation, be required. And, whereever the cage is mounted, it will be noted that the brace 26 acts to hold that part of the mounting base 15, and the cage, back against the conduit wall.

In Figs. 4 and 5 a typical form of rotor ball B is illustrated, being a ball with reaction vanes formed on it by way of forming recesses 28 spacedly around its periphery. These recesses are preferably arranged in rows or sets which are symmetrical to a central plane which becomes the plane of rotation of the ball. For instance in Figs. 4 and 5, two rows of the recesses 28 are illustrated, each row comprising three equally spaced recesses, and the recesses in the two rows being relatively staggered. The two rows are arranged symmetrically with reference to the plane indicated at P in Fig. 4; and when a ball of this type is subjected to the high velocity stream action of fluid flowing through intake pipe, the ball will orient itself and rotate in the plane P.

The most efficient size of the rotor ball varies somewhat with the size of the intake pipe and other conditions; and the cage is made of a size suitable to the size of the ball. The cage is, generally speaking, of such size as to just give the ball a free clearance when the ball is not touching or resting upon either end of the cage. The open end 22 of the cage is small enough that the ball cannot pass through that end. The other end 20 of the cage, conoidal in shape, is large enough that the ball may rest in it with some clearance; and in the application of the device to an intake pipe the end 20 of the cage is always placed in such relative position that it presents its cup formation to the flowing fluid stream. For instance, in Fig. 1 where the stream flow is upward, the conoidal cup end 20 of the cage is uppermost, the open end 22 of the cage being lowermost. In Fig. 2, where the fluid flow is downward, the position of the cage is reversed, the cup formation facing upwardly. In this latter figure, the ball will, at rest, rest in the bottom of the cage and rises against the fluid stream when in rotation; while in the arrangement of Fig. 1 the ball may be blown up against the fluid cushion in the cage end 20 by the fluid stream. In either case, the cup shape of that end of the cage causes formation of a fluid cushion inside the cup which prevents the ball, when in rotation, from coming into actual contact with the cup wall, therefore keeping the ball in free floating condition.

It is one of the features of my present improvement that, because the cage is anchored to the mounting base 15 at both ends, and because the mounting base itself is held against the passage wall not only by the mounting arms 17 but also by the brace 26, that all of the parts may be made of lighter material than has been otherwise possible. In former constructions the mounting and the cage have been very much susceptible to deformation and to heat warping; and for that reason it has been found necessary to make the cage of heavy wire and large enough to give the ball a fairly large clearance. My method of mounting makes it possible to make the whole mounting of lighter material, and particularly to make the cage of smaller and lighter wire, and of smaller size, with smaller clearance for the ball; and thereby very much cut down the obstruction presented to the free flow of fluid through the passage.

It will be understood that the device here under consideration may be mounted in any relative position in an intake passage, and that any number of the caged rotors may be applied to any one intake passage, either on one mounting base 15 or on a plurality of them placed in different positions. For instance, I show two of the cages C mounted upon a single mounting base in Fig. 2; and in that particular case it may be necessary only to use one of the braces 26, using the one furthest from the flanges 12a, the other brace being cut off.

Fig. 2 shows a situation in which a rather long length of the mounting base 15 is utilized. Fig. 1 shows a rather short length of the mounting base being utilized, the remainder having been cut off when the device was applied. Generally speaking, it will be seen that my improvements allow the cage and its rotor to be mounted in almost any position relative to the securing flanges 12 or 12a, and therefore in the most advantageous position with relation to the passage or conduit and with relation to the throttle valve. It is desirable, wherever possible, to mount the rotor in about the relative position shown, with relation to the throttle valve—and that is, close to it at the side indicated. In some cases, however, the diameter of the intake pipe is not sufficient to allow the ball and cage to be mounted in such a position without interfering with the full opening of the throttle valve; and in such cases my mounting allows the device to be mounted further away from the throttle valve as may be desired or necessary.

In Figs. 7 and following I show other and modified forms of rotor confining cage and rotor. The mounting used for these forms is the same as shown in Fig. 3, the base members 15 of that mounting being indicated in Fig. 7. The characteristic improved difference dealt with in Figs. 7 and following, as compared with the showings of Figs. 1 to 6, involves the provision of a rotor having an alining and/or initial orienting axis, and the provision of a suitable confining cage for such a rotor.

Thus, for instance, in Figs. 8 and 9 I illustrate a form of rotor which has a pivotal axis shaft 35 protruding on both sides of the rotor proper. Here the rotor proper, instead of being spheric, is formed as a body of revolution centered on the axis shaft 35. The shape may be roughly described as being double-conoidal with the conical surfaces concavely or convexly curved along their conical elements. These surfaces are indicated by the numeral 36. The central and largest diameter portion 37 of the rotor has a periphery suitable for the placements thereon of depressions or projections 38, as indicated; and on this periphery are set the reacting vanes 38, which in this case are also formed by depressions in the peripheral surface. This rotor, it will be noted, is symmetric with relation to its central plane of rotation (such a plane as is indicated in position by line 9—9 on Fig. 8) and its vanes are also symmetric with relation to that plane, so that the rotor tends to revolve in that plane. The axis shaft 35, as hereinafter pointed out, holds the rotor, whenever at rest, in its properly oriented position to immediately start rotation in its proper plane.

A suitable confining frame or cage for loosely supporting and guiding such a rotor is illustrated in Fig. 7 and comprises preferably two longitudinally (here, illustratively, vertically) extending guideways 40, preferably formed of and within a bent wire formation, the wire being so bent as to form closed ends, above and below, for the guideways. The wire or wires are also so formed as to include not only the guideway forming portions 41 but also supporting portions 42 and base portions 43 with attaching loops 44 at the ends of the base. As before, this confining cage may be attached to the base member 15 by rivets 27, and in any selected position along that member 15.

Associated with the guide structure just described, and forming a part of the cage, is a cup member 45 which performs the same general office as the cup portion 20 of the cage previously described. This cup member 45 may be formed with a base portion 46 which is also secured to the base 15 by rivets through slotted adjustment holes, and one of these rivets, as 27a, may also serve to secure the brace member 26a, which functions the same as before described.

Fig. 14 shows how a rotor, indicated there by the letter R, will rest with its axis in the lower ends of the guideways 40 when the apparatus is not in action. In this position the rotor is close to, but preferably not in actual physical contact with the cup 45; and the cup 45 is so placed with reference to the rotor that instead of the deepest part of the cup being vertically in line with the center of the rotor, that deepest part, indicated for instance as the point 59 in Fig. 14, is somewhat behind the center of the rotor. The general result of this arrangement is that the fluid stream may enter the cup behind the rotor, and, flowing between the rotor and the interior cup surface forms a fluid cushion that readily picks up the rotor to move it away from the cup and to move its axis shaft away from the guideway end into a position where the rotor is then freely floated for free rotation. Also such diversion of the fluid stream increases the R. P. M. attainable by the central position of cup 50, such as is the case with the wire cup 20.

In the particular form of cup shown in Fig. 7, a grooved or recessed portion 45a is provided to accommodate the outermost or rim portion of such a rotor as shown in Figs. 8 and 9, or to accommodate the protruding vanes 38a which may be applied to such a rotor as shown in Figs. 10 and 11. In these latter figures a rotor R is shown, having the same axis shaft 35 as before described; but the rotor here is of oblate spheroid shape, and the reaction vanes are formed by protrusions 38a arranged around its periphery symmetric with relation to the central plane of rotation. These projecting vanes are here shown in "sand-dune" shape — the general wind-streamed shape in which free flowing solid will be piled up. This form is stream-lined as offering least resistance to their passage through the fluid, but absorbing a maximum amount of energy from fluid flowing past them.

In Fig. 12 another rotor arrangement is illustrated, wherein the single axis shaft 35 carries not only a central rotor $R_1$ between the two guides 41 but also carries, at each side a supplemental rotor $R_2$. The combination rotor thus illustrated in Fig. 12 may have its rotors made up individually in any suitable or relative sizes and of any suitable individual design. I may mention also that, in addition to the inherent tendency of these symmetric rotors to rotate in their central plane, any tendency of the rotor to tip out of that plane is also opposed by the lateral confinement of the rotor itself between the two sets of guideways 40, 41. For instance, the oblate spheroid rotor R of Figs. 10 and 11, when placed in the guideways 40, not only has its shaft 35 guided loosely by those guideways, but the rotor R is of such size as to be laterally confined more or less closely between the two guides.

In Fig. 13 I illustrate the application of fans to a rotor. Here the rotor R is illustrated as of the form of Figs. 10 and 11. Its axis shaft 35 extends outwardly beyond the guides 41, and at each end the shaft is provided with a small fan 55, the blades of which are properly arranged, with reference to the direction of rotor rotation, to positively feed fluid inwardly toward the rotor, as indicated by the direction arrows in the figures. The centrifugal action of the rotors is of course to throw fluid outwardly at the periphery, as indicated by the direction arrows, and thus the tendency is for the rotor to draw air inwardly around its axis of rotation. Provision of positive fluid driving fans assists this action and makes the rotor action more effective.

Lastly in Fig. 15 I illustrate a further simplified means of holding the rotor, when at rest, in proper position for instantaneous and efficient starting. In this type gravity causes the rotor R and its shaft 35 to come to rest at the desired position as shown. In these drawings the confining means 60 is made of wire with base portions 63 with attaching loops 64 at the end of the base (see Fig. 16). The conduit for the fluid stream in this illustration is square but this form can be applied to any conduit where the fluid stream is such that gravity can carry the rotor and shaft when at rest to its normal starting position. In this type no confining means for the shaft 35, when spinning with its attached rotor is necessary as gyroscopic action of the spinning rotor prevents it from turning over. In this type no positive limit is placed upon the distance the rotor R and its shaft 35 will rise with the fluid stream as this is controlled by the weight of the rotor and shaft and the variable cross-sectional area of the conduit 116 by means of which the velocity of the fluid stream can be controlled at this point. For instance, a flare in the conduit as illustrated, just above the rest position of the rotor reduces the fluid velocity so that the rotor will rise to a certain height and no further.

In these last described forms of rotor (Figs. 9 and following) it will be noted that the axis shaft 35, although it forms a physical axis for the rotor, is not an axle (which the terrific R. P. M. would burn up) in the ordinary sense of the term, but is a floating axial guide which forms an orienting support for the rotor when at rest. In the old form of rotor and cage, in which the ball at rest, rests upon the cage, the ball must be lifted out of contact with the cage before it can start its action of orientation and rotation; and in a great many cases this does not take place until the engine speed, or fluid stream velocity, is quite high. In a great many cases this action of lifting the ball does not take place in or during the lower ranges of engine operation. In my improved forms of rotor, where the rotor body itself does not contact directly with any cage, the rotor is always in proper orientation, and can start rotating at very low ranges of engine operation even though the axis shaft is still resting on the lower ends of the guides before the rotor has been raised to its full floating position.

The form of confining cage or frame utilized in Fig. 7 also presents very much less restriction to the fluid flow than does the form of cage shown in Figs. 1 to 6; and in the form of Fig. 7 there is no possibility of the rotor becoming wedged in the cage. The general form of Figs. 7 and following also allows the use of a rotor with vanes formed by projection rather than by depressions; and it also facilitates the use of non-spheric rotors, such as illustrated. In particular, the form of rotor shown in Figs. 8 and 9 lends itself very efficiently to the desired functions as its contours which are presented to the fluid flow are more or less streamlined to that flow. In other words, in this general type of rotor there is no inherent limitation on the sectional figure of the rotor, with the result that it can be designed in such manner as to present the least possible resistance to the fluid flow.

I claim:

1. In combination with a conduit adapted to convey a stream of gaseous fluid and entrained particles, or the like, a mounting comprising an elongate base member adapted at one point in its length for attachment to a wall of the conduit, a rotor rotatable by the fluid stream and adapted to float on the fluid stream, a rotor confining cage adapted to confine the rotor loosely and attachable to the elongate base member at any selected position in the length of that member, and a deformable brace member mounted on the base member in spaced relation with the point of attachment of said base member to said wall and in association with the cage, said brace member extending to and bearing against an opposite wall of the conduit to press the cage and base member against the wall to which the latter is attached.

2. In combination with a conduit adapted to convey a stream of gaseous fluid and entrained particles, or the like, a mounting comprising an elongate base member having at one point in its length a means for attachment to a conduit wall in such manner that the base member lies lengthwise along the conduit wall, a rotor rotatable by the fluid stream and adapted to float on the fluid stream, a rotor confining cage adapted to confine the rotor loosely and attachable at two spaced points at any selected position along the length of the base member, and a spring brace member attachable to the base member in association with the cage, reaching across the conduit and bearing against an opposite wall to press the cage and base member against the wall to which the latter is attached.

3. In combination with a conduit adapted to convey a stream of gaseous fluid and entrained particles, or the like, a mounting comprising an elongate base member having at one point in its length a means for attachment to a conduit wall in such manner that the base member lies lengthwise along the conduit wall, a rotor rotatable by the fluid stream and adapted to float on the fluid stream, a rotor confining cage adapted to confine the rotor loosely and attachable at two spaced points at any selected position along the length of the base member, said cage comprised of a formed wire structure with wire formed attaching loops at opposite ends, and a brace member formed by an extension of the cage wire beyond one of the attaching loops, reaching across the conduit and bearing against an opposite wall to press the cage and base member against the wall to which the latter is attached.

4. In a device of the class described, the combination of a cage adapted to confine loosely a rotor in a stream of rapidly moving fluid for free floating in and rotation by that stream, said cage being formed of a helically wound wire and comprising a body of conoidal shape at one end wherein the wire helix is wound closely, and of slightly tapering frustro-conical shape at the other end wherein the wire helix is wound openly, the wire being extended beyond the helix formation at each end to form an attaching loop, and a rotor loosely contained within said cage.

5. In a device of the class described, the combination of a cage adapted to confine loosely a rotor in a rapidly moving stream of fluid for free floating in and rotation by that stream, said cage being formed of a helically wound wire and comprising a body of conoidal shape at one end wherein the wire helix is wound closely, and of slight tapering frustro-conical shape at the other end wherein the wire helix is wound openly, the wire being extended beyond the helix formation at each end to form an attaching loop, and extended beyond one of said loops in the form of a brace, and a rotor loosely contained within said cage.

6. For use in combination with a conduit adapted to convey a stream of gaseous fluid and entrained particles, or the like, a rotor mounting and confining means attachable to the conduit and comprising means affording parallel, ended guideways extending longitudinally of said conduit, a rotor comprising a solid of revolution rigidly mounted on a physical axis of rotation and having peripheral vanes arranged symmetrically with relation to a central plane of rotation, the physical axis of the rotor being at right angles to and loosely confined by said guideways.

7. For use in combination with a conduit adapted to convey a stream of gaseous fluid and entrained particles, or the like, a rotor mounting and confining means attachable to the conduit and comprising means affording parallel, ended guideways extending longitudinally of said conduit, a rotor comprising a solid of revolution rigidly mounted on a physical axis of rotation, the physical axis of the rotor being at right angles to and loosely confined by said guideways.

8. For use in combination with a conduit adapted to convey a stream of gaseous fluid and entrained particles, or the like, a rotor mounting and confining means attachable to the conduit and comprising means affording a pair of horizontally spaced vertically extending guideways with closed upper and lower ends, a horizontal axis shaft extending transversely through both guideways and loosely confined thereby, and a rotor mounted on the shaft and confined laterally between the guideways.

9. For use in combination with a conduit adapted to convey a stream of gaseous fluid and entrained particles, or the like, a rotor mounting and confining means attachable to the conduit and comprising means affording a pair of spaced guideways with closed ends, an axis shaft extending transversely through both guideways and loosely confined thereby, a rotor mounted on the shaft and confined laterally between the guideways, and a fluid cushion cup located in such position relative to one end of the guideways that the rotor substantially just contacts with the cup when the rotor is in a terminal position limited by the guideways.

10. In a device of the class described, the combination of a rotor comprising an axis shaft and a rotor body thereon symmetric relative to the axis shaft, and to a central plane of its rotation about said shaft, said axis shaft projecting from both sides of said rotor body, the body having peripheral vanes arranged symmetrically with reference to said plane of rotation, and means loosely to confine the projecting portions of said axis shaft and thereby to loosely locate the rotor in a fluid stream.

11. For use in homogenizing a downwardly travelling stream of gaseous fuel or the like, the combination of: a conduit adapted to confine said downwardly travelling stream; a base member mounted within said conduit; a substantially open frame secured to said base member and extending into the stream passing through said conduit; a rotor loosely supported by said frame and adapted to float in and to be rotated by said stream, said rotor and frame being constructed so as to permit movement of said rotor in a direction substantially parallel to the stream flow, and a cup member associated with said frame and adapted to form a fluid cushion for said rotor at the lower extremity of its movement, the deepest portion of said cup being offset from the central line of travel of said rotor.

12. For use in homogenizing a stream of gaseous fuel or the like, the combination of: a conduit adapted to confine said stream; a base member mounted against the wall of said conduit; a substantially open frame secured to said base member and extending into the stream passing through said conduit; and a rotor loosely supported by said frame and adapted to float in and to be rotated by said stream, said frame having parallel guide slots extending substantially longitudinally of said conduit and said rotor having a physical axis rigid therewith and extending through said slots.

13. For use in homogenizing a stream of gaseous fuel or the like, the combination of: a conduit adapted to confine said stream; a base member mounted against the wall of said conduit; a substantially open frame secured to said base member and extending into the stream passing through said conduit; a rotor loosely supported by said frame and adapted to float in and to be rotated by said stream, said frame having parallel guide slots extending substantially longitudinally of said conduit and said rotor having a physical axis rigid therewith and extending through said slots; and auxiliary rotors on the projecting ends of said axis.

14. For use in homogenizing a stream of gaseous fuel or the like, the combination of: a conduit adapted to confine said stream; an elongate base member mounted against the wall of said conduit; means at one point in the length of said base member for securing same in said conduit; a deformable brace mounted on said base member at another point in its length and having its free end bearing against an opposite wall surface in said conduit; a substantially open frame secured to said base member and extending into the stream passing through said conduit; and a rotor loosely supported in said frame and adapted to float on and to be rotated by said stream.

15. For use in homogenizing a stream of gaseous fuel or the like, the combination of: a conduit comprised of two abutting sections adapted to confine said stream; an elongate base member mounted against the wall of said conduit; means on said base member engaged between abutting ends of said conduit sections for securing said base member in said conduit; a brace on said base member in spaced relation with said securing means, said brace having its free end bearing against an opposite wall surface in said conduit; a substantially open frame secured to said base member and extending into the stream passing through said conduit; and a rotor loosely supported in said frame and adapted to float on and to be rotated by said stream.

16. For use in homogenizing a stream of gaseous fuel or the like, the combination of: a conduit adapted to confine said stream, said conduit having a joint; a base member extending longitudinally of the conduit and mounted against an inside surface of the wall of said conduit, said base member having a portion received and clamped within said conduit joint; a substantially open frame attachable to said base member at any selected position in the length of said base member, so as to extend into the stream passing through said conduit; and a rotor loosely supported by said frame and adapted to float in and to be rotated by said stream, said rotor and frame being constructed so as to permit movement of said rotor in a direction substantially parallel to the stream of flow.

17. In combination with a conduit adapted to convey a stream of gaseous fluid and entrained particles or the like, a mounting comprising an elongate base member having means at one point in its length for attachment to a wall of the conduit, a rotor rotatable by and adapted to float on the fluid stream, and a rotor confining cage adapted to confine the rotor loosely and attachable to the elongate base member at any selected point along the length thereof, whereby said cage may be positioned in the conduit with said rotor confined within a selected operating zone along said conduit.

18. In combination with a conduit adapted to convey a stream of gaseous fluid and entrained particles or the like, said conduit having a joint, a mounting comprising an elongate base member adapted to be positioned within said conduit and adjacent an inside wall surface thereof, said base member having a mounting portion extending transversely of its length and adapted to be received and clamped between the abutting ends of the conduit at said joint, a rotor rotatable by and adapted to float on the fluid stream, and a rotor confining cage adapted to confine the rotor loosely and attachable to the elongate base member at any selected point along the length thereof, whereby said cage may be positioned in the conduit with said rotor confined within a selected operating zone along said conduit.

19. In combination with a conduit adapted to convey a stream of gaseous fluid and entrained particles or the like, said conduit having a joint, a mounting comprising a transversely curved elongate base member adapted to be positioned within said conduit with its convex surface adjacent an inside wall surface thereof, said base member having a mounting portion extending transversely of its length and adapted to be received and clamped between the abutting ends of the conduit at said joint, a rotor rotatable by and adapted to float on the fluid stream, and a rotor confining cage adapted to confine the rotor loosely and attachable to the elongate base member at any selected point along the length thereof, whereby said cage may be positioned in the conduit with said rotor confined within a selected operating zone along said conduit.

20. In a device for acting on fluids flowing in a stream, a rotor comprising a rotor body and an axis shaft rigid therewith, and guide means affording parallel guide ways extending substantially longitudinally of the stream loosely to confine said axis shaft in a position transversely of the stream and whereby the rotor is axially located in the fluid stream but is movable in a direction normal to the axis.

21. In a device for acting on fluids flowing in a stream, a rotor comprising a rotor body and an axis shaft rigid therewith, and a guide frame affording parallel guide ways extending substantially longitudinally of the stream loosely supporting the axis shaft in a position transversely of the stream and whereby the rotor is axially supported in a position of rest from which it is free to rise in the direction of fluid stream flow.

22. In a device for acting on fluids flowing in a stream, a rotor comprising a rotor body and an axis shaft rigid therewith, and guide means affording parallel guideways extending substantially longitudinally of the stream loosely confining the ends of said axis shaft with said shaft extending transversely of the stream and whereby the rotor is axially located in the fluid stream and is movable in a direction normal to the axis, said rotor body having a stream-lined configuration in an axial plane.

23. In a device for acting on fluids flowing in a stream, a rotor comprising a rotor body and an axis shaft rigid therewith, and guide means affording parallel guideways extending substantially longitudinally of the stream loosely confining the ends of said axis shaft with said shaft extending transversely of the stream and whereby the rotor is axially located in the fluid stream, and is movable in a direction normal to the axis, and a fluid propulsion fan mounted on the axis shaft spaced from the rotor body and adapted to move fluid axially in toward the rotor body.

24. In a device for acting on fluids flowing in a stream, a rotor comprising a rotor body and an axis shaft rigid therewith, and guide means affording parallel guide ways extending substantially longitudinally of the stream, said guideways loosely confining the ends of said axis shaft with said shaft positioned transversely of the stream and whereby the rotor is axially located in the fluid stream and is movable in a direction normal to the axis.

25. In a device for acting on fluids flowing in a stream, a rotor including an axis shaft rigid therewith, spaced guideways extending substantially longitudinally of the stream and through which said axis shaft projects in a direction transversely of the stream, the ends of said axis shaft being loosely confined by said guideways for rotation and longitudinal movement therealong, a rotor body on the shaft between the spaced guideways, and a rotor body on the shaft exterior to each of the guideways.

MARCUS M. CORY.